(12) United States Patent
Xie et al.

(10) Patent No.: US 12,382,253 B2
(45) Date of Patent: Aug. 5, 2025

(54) METHOD FOR MODE SWITCHING AND DEVICE

(71) Applicant: VIVO MOBILE COMMUNICATION CO., LTD., Guangdong (CN)

(72) Inventors: Zhenhua Xie, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 415 days.

(21) Appl. No.: 17/878,326

(22) Filed: Aug. 1, 2022

(65) Prior Publication Data

US 2022/0377507 A1    Nov. 24, 2022

Related U.S. Application Data

(63) Continuation of application No. PCT/CN2021/077043, filed on Feb. 20, 2021.

(30) Foreign Application Priority Data

Feb. 21, 2020   (CN) .......................... 202010108819.5

(51) Int. Cl.
*H04W 4/06*     (2009.01)
*H04W 48/18*    (2009.01)
*H04W 76/10*    (2018.01)

(52) U.S. Cl.
CPC ............. *H04W 4/06* (2013.01); *H04W 48/18* (2013.01); *H04W 76/10* (2018.02)

(58) Field of Classification Search
CPC ....... H04W 4/06; H04W 76/10; H04W 48/18; H04W 36/0007; H04W 76/11;
(Continued)

(56) References Cited

U.S. PATENT DOCUMENTS

2008/0107208 A1* 5/2008 Kudou .................. H03G 3/348
                                                    381/104
2013/0294321 A1   11/2013 Wang et al.
(Continued)

FOREIGN PATENT DOCUMENTS

CN      101242581 A      8/2008
CN      104918204 A      9/2015
(Continued)

OTHER PUBLICATIONS

"3rd Generation Partnership Project; Technical Specification Group Services and System Aspects; Study on architectural enhancements for 5G multicast-broadcast services (Release 17)", 3GPP TR 23.757 V0.3.0 (Jan. 2020), Valbonne, France.
(Continued)

*Primary Examiner* — Ankur Jain
(74) *Attorney, Agent, or Firm* — Price Heneveld LLP

(57) ABSTRACT

Embodiments of the present invention provide a method for mode switching and a device. The method includes: invoking a mode switch operation towards a second network function, where a parameter of the mode switch operation includes first information, and the first information includes a mode switch command; and the mode switch command is used to notify a target party to perform a mode switch operation.

20 Claims, 12 Drawing Sheets

(58) Field of Classification Search
CPC . H04W 76/40; H04W 24/02; H04W 36/0055; H04L 61/5069
See application file for complete search history.

(56) References Cited

U.S. PATENT DOCUMENTS

| | | | |
|---|---|---|---|
| 2014/0177504 A1* | 6/2014 | Sayeed | H04W 4/06 370/312 |
| 2014/0286222 A1 | 9/2014 | Yu et al. | |
| 2020/0100213 A1 | 3/2020 | Chandramouli et al. | |
| 2022/0053456 A1* | 2/2022 | Lei | H04W 72/30 |

FOREIGN PATENT DOCUMENTS

| | | | |
|---|---|---|---|
| CN | 105472548 | A | 4/2016 |
| CN | 108886669 | A | 11/2018 |
| CN | 110809299 | A | 2/2020 |
| EP | 3089487 | A1 | 11/2016 |
| IN | 104871570 | A | 8/2015 |
| WO | 2012048464 | A1 | 4/2012 |
| WO | 2018076280 | A1 | 5/2018 |
| WO | 2020035795 | A1 | 2/2020 |

OTHER PUBLICATIONS

Vivo, "Solution for unicast switch to multicast based on network application level control", SA WG2 Meeting #136AH, S2-2001358, Jan. 13-17, 2020, Seoul, Korea.

Samsung, "Solution for unicast-multicast delivery mode switch", 3GPP SA WG2 Meeting #136-AH, S2-2000891, Jan. 13-17, 2020, Incheon, South Korea.

Tencent, "New Solution for mode switching between unicast and multicast", 3GPP TSG SA WG2 Meeting #136Adhoc, S2-2000605, Incheon, Korea, Jan. 13-17, 2020.

Vivo, "Solution for unicast switch to multicast based on application level control", SA WG2 Meeting #136AH, S2-2000151, Jan. 13-17, 2020, Seoul, Korea Vivo, "Solution for unicast switch to multicast based on UE control", SA WG2 Meeting #136AH, S2-2000150, Jan. 13-17, 2020, Seoul, Korea Huawei, "Service continuity for group communication over eMBMS", 3GPP TSG-RAN WG2 #85, R2-140261, Prague, Czech Republic, Feb. 10-14, 2014.

* cited by examiner

METHOD FOR MODE SWITCHING AND DEVICE

CROSS-REFERENCE TO RELATED APPLICATIONS

This application is a continuation application of PCT International Application No. PCT/CN2021/077043 filed on Feb. 20, 2021, which claims a priority to Chinese Patent Application No. 202010108819.5, filed on Feb. 21, 2020 in China, which are incorporated herein by reference in their entireties.

TECHNICAL FIELD

Embodiments of the present invention relate to the field of communications technologies, and specifically, to a method for mode switching and a device.

BACKGROUND

Different from a broadcast manner for fixed receivers, a multimedia broadcast/multicast service (MBMS) has mobile users. Due to user mobility, when a user moves from a cell covered by the current MBMS to another cell not covered by the MBMS, an inter-cell handover is required. If the user is interested in the current MBMS or is receiving the current MBMS, the user further needs to consider switching between a multicast bearer and a unicast bearer of the MBMS service between a multicast cell and a unicast cell during the inter-cell handover.

At present, how to switch between a multicast bearer and a unicast bearer in the fifth generation mobile communications technology (5th generation, 5G) network is an urgent problem to be resolved.

SUMMARY

According to a first aspect, an embodiment of the present invention provides a method for mode switching, applied to a first network function, where the method includes:

invoking a mode switch operation towards a second network function, where a parameter of the mode switch operation includes first information, and the first information includes a mode switch command; and the mode switch command is used to notify a target party to perform a mode switch operation.

According to a second aspect, an embodiment of the present invention provides a method for mode switching, applied to a second network function, where the method includes:

determining whether a mode switch operation is invoked by a first network function, where a parameter of the mode switch operation includes first information, and the first information includes a mode switch command; and when the mode switch operation is invoked by the first network function, invoking a service operation towards a fifth network function, where a parameter of the service operation includes content of the mode switch command; or sending the mode switch command to a user terminal; or sending the mode switch command to a radio access network node.

According to a third aspect, an embodiment of the present invention provides a method for mode switching, applied to a user terminal, where the method includes:

receiving a mode switch command from a network side; and sending a first message to the network side, where the first message is used for the user terminal to establish a unicast channel or a multicast channel for service data transmission with the network side, or for the user terminal to send a second message to an application server, and the second message is used to notify the application server to send service data to the user terminal.

According to a fourth aspect, an embodiment of the present invention provides a network function, which is a first network function, including:

a first invocation module, configured to invoke a mode switch operation towards a second network function, where a parameter of the mode switch operation includes first information, the first information includes a mode switch command, and the mode switch command is used to notify a target party to perform a mode switch operation.

According to a fifth aspect, an embodiment of the present invention provides a network function, which is a second network function, including:

a second invocation module, configured to determine whether a mode switch operation is invoked by a first network function, where a parameter of the mode switch operation includes first information, and the first information includes a mode switch command; and a first sending module, configured to: when the mode switch operation is invoked by the first network function, invoke a service operation towards a fifth network function, where a parameter of the service operation includes content of the mode switch command; or send the mode switch command to a user terminal; or send the mode switch command to a radio access network node.

According to a sixth aspect, an embodiment of the present invention provides a user terminal, including:

a receiving module, configured to receive a mode switch command from a network side; and a second sending module, configured to send a first message to the network side, where the first message is used to establish a unicast channel or a multicast channel for service data transmission with the network side, or to send a second message to an application server, and the second message is used to notify the application server to send service data to the user terminal.

According to a seventh aspect, an embodiment of the present invention provides a communications device, including: a processor, a memory, and a program stored on the memory and capable of running on the processor, where when the program is executed by the processor, the steps of the method for mode switching according to the first aspect, the second aspect, or the third aspect are implemented.

According to an eighth aspect, an embodiment of the present invention provides a computer-readable storage medium, where the computer-readable storage medium stores a computer program, and when the computer program is executed by a processor, the steps of the method for mode switching according to the first aspect, the second aspect, or the third aspect are implemented.

BRIEF DESCRIPTION OF DRAWINGS

Other advantages and benefits will become clear to persons skilled in the art from the detailed description of the following preferred implementations. The accompanying drawings are merely used for showing the preferred implementations, and are not considered as a limitation to the present invention. In all the accompanying drawings, the same reference numeral is used to denote the same component. In the accompanying drawings.

DETAILED DESCRIPTION OF EMBODIMENTS

Figure 1:
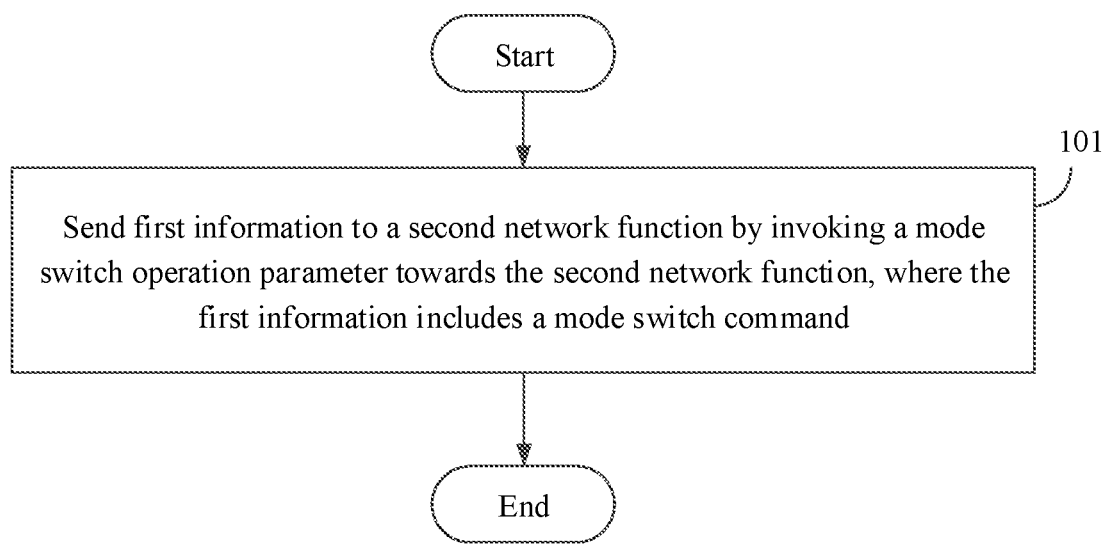
FIG. 1 is a flowchart 1 of a method for mode switching according to an embodiment of the present invention.

The technical solutions in the embodiments of the present invention will be clearly described below with reference to the accompanying drawings in the embodiments of the present invention. Apparently, the embodiments described are some rather than all of the embodiments of the present invention. All other embodiments derived by persons of ordinary skill in the art based on the embodiments of the present invention without any inventive effort shall fall within the scope of protection of the present invention The term "include/comprise" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present invention, the term such as "exemplary" or "for example" is used to represent giving an example, an illustration, or a description. Any embodiment or design described by "exemplary" or "for example" in the embodiments of the present invention should not be construed as being more preferred or advantageous than other embodiments or designs. To be precise, the use of the term such as "exemplary" or "for example" is intended to present a related concept in a specific manner.

In the embodiments of the present invention, a network function may be implemented by a physical network device, or may be implemented by an instance in a virtual machine. In other words, the network function may be a physical device or a virtual apparatus.

The technology described herein is not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. A CDMA system may implement radio technologies such as CDMA2000 and universal terrestrial radio access (UTRA). UTRA includes wideband CDMA (WCDMA) and other CDMA variants. A TDMA system may implement radio technologies such as the global system for mobile communications (GSM). An OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technology described herein may be used in the above-mentioned systems and radio technologies as well as other systems and radio technologies.

A user terminal provided in the embodiments of the present invention may be a mobile phone, a tablet computer, a laptop computer, an ultra-mobile personal computer (UMPC), a netbook, or personal digital assistant (PDA), a mobile Internet device (MID), a wearable device, a vehicle-mounted device, or the like.

Referring to FIG. 1, an embodiment of the present invention provides a method for mode switching. The method may be performed by a first network function, and the first network function is a network function, such as a multicast broadcast service function (MBSF), in a core network. The method includes step 101.

Step 101: Invoke a mode switch operation towards a second network function, where a parameter of the mode switch operation includes first information, and the first information includes a mode switch command.

The mode switch command is used to notify a target party to perform a mode switch operation, where the mode switch operation includes: switching from unicast mode to multicast mode, and switching from multicast mode to unicast mode.

In some implementations, the target party may be a user terminal or a radio access network node (for example, a base station). To be specific, the user terminal may perform switching from unicast mode to multicast mode or switching from multicast mode to unicast mode based on a trigger by a core network network element, or the base station may perform switching from unicast mode to multicast mode or switching from multicast mode to unicast mode based on the trigger by the core network network element.

In some implementations, the second network function may be a multicast broadcast session management function (MB-SMF) or an access and mobility management function (AMF), and certainly is not limited thereto.

In some implementations, before step 101, the method further includes:

performing, based on a user count of multicast service (for example, a total number of users of multicast service), or a user count in a multicast service area, or a service operation being invoked, the invoking a mode switch operation towards a second network function, for example, a mode switch operation of switching from unicast mode to multicast mode, or a mode switch operation switching from multicast mode to unicast mode.

The user count of multicast service may be the total number of users of multicast service.

The user count in a multicast service area may be the number of users in a multicast service tracking area.

The service operation being invoked includes: a multicast service operation being invoked (for example, an application server invokes a service operation towards the MBSF, or the MB-SMF invokes a service operation towards the MBSF), or the application server invoking a unicast service operation.

For example, if the total number of users of multicast service or the number of users in a multicast service area is greater than a preset value, or if the multicast service operation is invoked, the invoking a mode switch operation towards a second network function is performed to switch from unicast mode to multicast mode.

For another example, if the total number of users of multicast service or the number of users in a multicast service area is less than the preset value, or if the unicast service operation is invoked, the invoking a mode switch operation towards a second network function is performed to switch from multicast mode to unicast mode.

In some implementations, the first information further includes one or more of the following:

(1) user information, for example, a user identity (User ID), such as a subscription permanent identifier (SUPI) or an international mobile subscriber identity (IIMSI); and (2) information about an AMF serving a user terminal, for example, an AMF identifier (such as a globally unique AMF identifier (Globally Unique AMF ID, GUAMI)).

In some implementations, before step 101, the method further includes: querying a unified data management function (UDM) for information about an AMF.

In some implementations, the mode switch command includes service information (or referred to as multicast service information) or session information.

The service information is used for at least one of the following:

(1) for the user terminal to send a first message to a network side, where the first message is used for the user terminal to establish a unicast channel or a multicast channel for service data transmission with the network side; and (2) for the user terminal to send a second message to an application server, where the second message is used to notify the application server to send service data to the user terminal.

The session information is used for at least one of the following:

(1) for the radio access network node (for example, a base station) to send a third message to a core network, where the third message is used for the radio access network node to establish or maintain a multicast channel for service data transmission with a third network function (for example, a multicast broadcast user plane function (MB-UPF)), or the third message is used for the radio access network node to establish a unicast channel for service data transmission with a fourth network function (for example, a user plane function (UPF)); and (2) for the radio access network node to send no message to maintain a multicast channel for service data transmission with the third network function (for example, the MB-UPF).

The unicast channel means a core network user plane function (for example, the UPF) establishes a channel for service data transmission with each user terminal to separately send service data to each user terminal, including: a channel between the core network user plane function and the radio access network node, and a channel between the radio access network node and the user terminal.

The multicast channel includes channels for service data transmission between the core network user plane function (for example, the MB-UPF) and radio access network nodes. Such channels allow the core network user plane function to separately send service data to each radio access network node, so that a radio access network node can send service data to all user terminals covered by the same radio access network node. The channel is shared by all user terminals of that service served by that radio access network node.

In some implementations, the mode switch command includes one or more of the following:

(1) information about the third network function, for example, address information of the MB-UPF;

(2) a temporary mobile group identity (TMGI);

(3) a multicast address, for example, an IP multicast address; and (4) a protocol data unit session identifier (PDU session ID).

In this embodiment of the present invention, a network function in a core network can initiate a mode switch operation of a multicast service or a unicast service.

Figure 2:
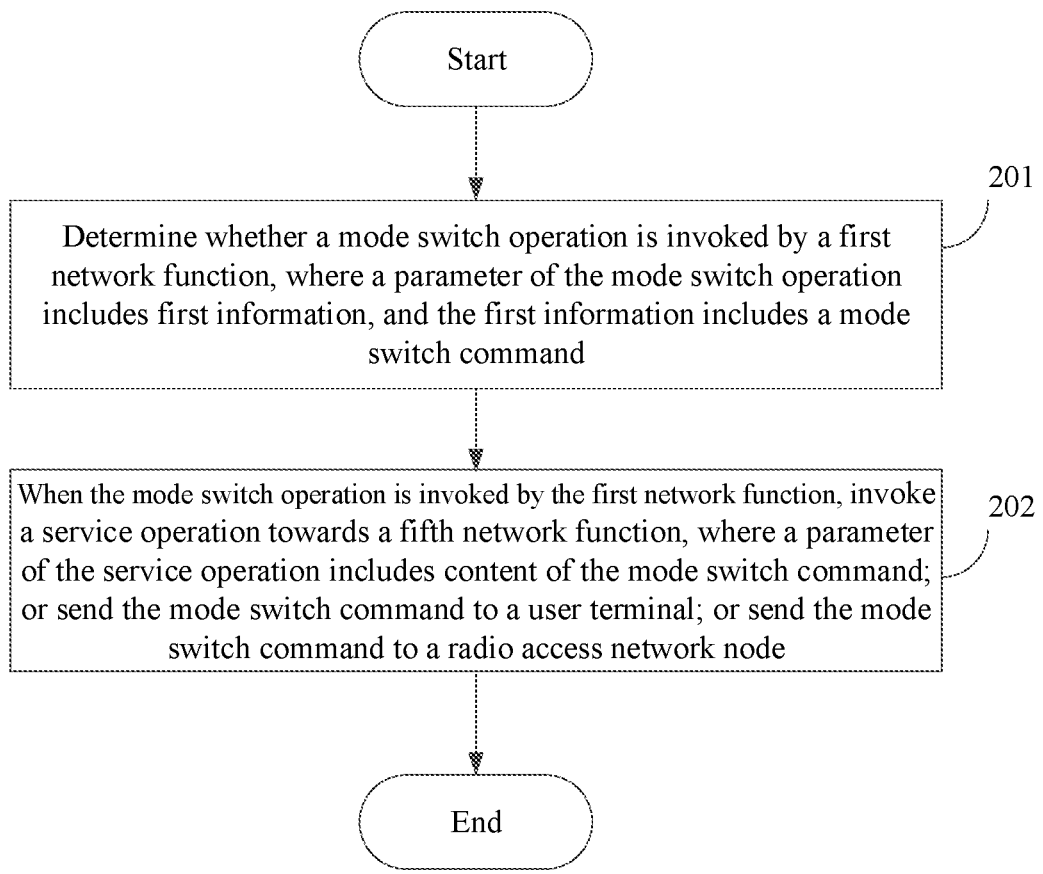
FIG. 2 is a flowchart 2 of a method for mode switching according to an embodiment of the present invention.

Referring to FIG. 2, an embodiment of the present invention further provides a method for mode switching. The method may be performed by a second network function, and the second network function is a network function, such as an MB-SMF or an AMF, in a core network. The method includes the following steps.

Step 201: Determine whether a mode switch operation is invoked by a first network function, where a parameter of the mode switch operation includes first information, and the first information includes a mode switch command.

It can be understood that the first network function is a network function, such as an MBSF, in the core network.

Step 202: When the mode switch operation is invoked by the first network function, invoke a service operation towards a fifth network function, where a parameter of the service operation includes content of the mode switch command; or send the mode switch command to a user terminal; or send the mode switch command to a radio access network node.

It can be understood that, if the second network function is the MB-SMF, the fifth network function is the AMF.

In some implementations, the first information further may further include one or more of the following:

(1) user information, for example, a user identity, such as an SUPI or an IMSI; and (2) information about an AMF serving the user terminal, for example, an AMF identifier, such as a GUAMI.

In some implementations, before step 201, the method may further include: querying a unified data management function for the information about the AMF serving the user terminal.

In this embodiment of the present invention, a network function in a core network can initiate a mode switch operation for a multicast service or a unicast service, so that a user can switch between a multicast bearer and a unicast bearer in a 5G network, thereby improving reliability of a communications system.

Figure 3:
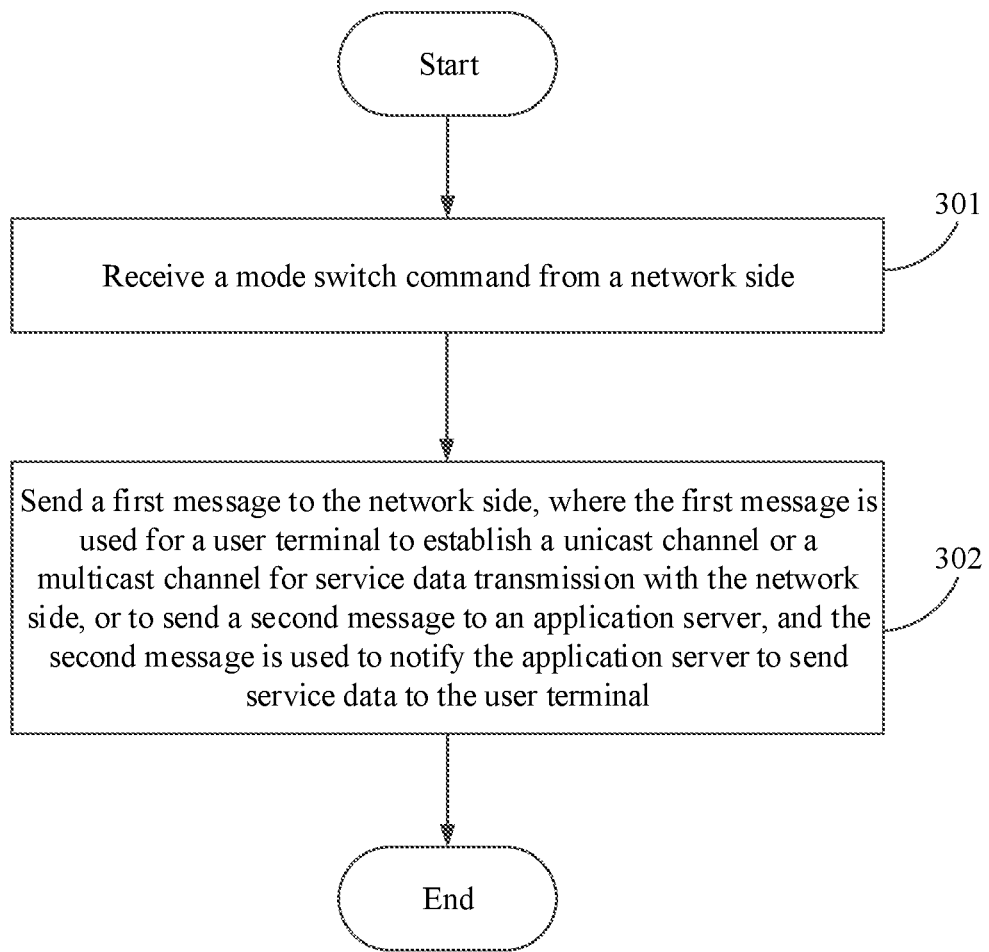
FIG. 3 is a flowchart 3 of a method for mode switching according to an embodiment of the present invention.

Referring to FIG. 3, an embodiment of the present invention further provides a method for mode switching. The method may be performed by a user terminal. The method includes steps 301 and 302.

Step 301: Receive a mode switch command from a network side.

Optionally, the mode switch command is obtained by a second network function from a parameter of a mode switch operation invoked by a first network function.

Optionally, the mode switch command includes service information. The service information is used for at least one of the following: for the user terminal to send a first message to the network side, where the first message is used for the user terminal to establish a unicast channel or a multicast channel for service data transmission with the network side; and for the user terminal to send a second message to an application server, where the second message is used to notify the application server to send service data to the user terminal.

Optionally, the mode switch command includes one or more of the following: a TMGI and a multicast address.

Step 302: Send the first message to the network side, where the first message is used for the user terminal to establish a unicast channel or a multicast channel for service data transmission with the network side, or for the user terminal to send the second message to the application server, and the second message is used to notify the application server to send service data to the user terminal.

In some implementations, the first message includes the service information.

The service information is used for the user terminal to send the first message to the network side, where the first message is used to establish the unicast channel or the multicast channel for service data transmission with the network side; or the service information is used for the user terminal to send the second message to the application server (for example, a content provider), where the second message is used to notify the application server to send service data to the user terminal.

In some implementations, the service information includes one or more of the following: (1) the TMGI; and (2) the multicast address, for example, an IP multicast address.

In this embodiment of the present invention, a user terminal can switch between a multicast bearer and a unicast bearer based on a mode switch operation for a multicast service or a unicast service initiated by a network function in a core network, thereby improving reliability of a communications system.

Implementations of the present invention are described below with reference to Embodiment 1 to Embodiment 7, where a first network element is an MBSF, a second network element is a radio access network node, a third network element is an MB-UPF, a fourth network element is a UPF, and a fifth network element is an MB-SMF.

When determining to switch modes, the MBSF needs to notify the MB-SMF to establish a shared channel (unicast to multicast) between the MB-UPF and a RAN node or notify a user terminal (UE) to establish a protocol data unit session (PDU session) (multicast to unicast), so that the MB-UPF can forward multicast data over the shared channel, or forward data (unicast) of each user terminal (per UE) over the PDU session between the UPF and the UE.

Embodiment 1

Figure 4:
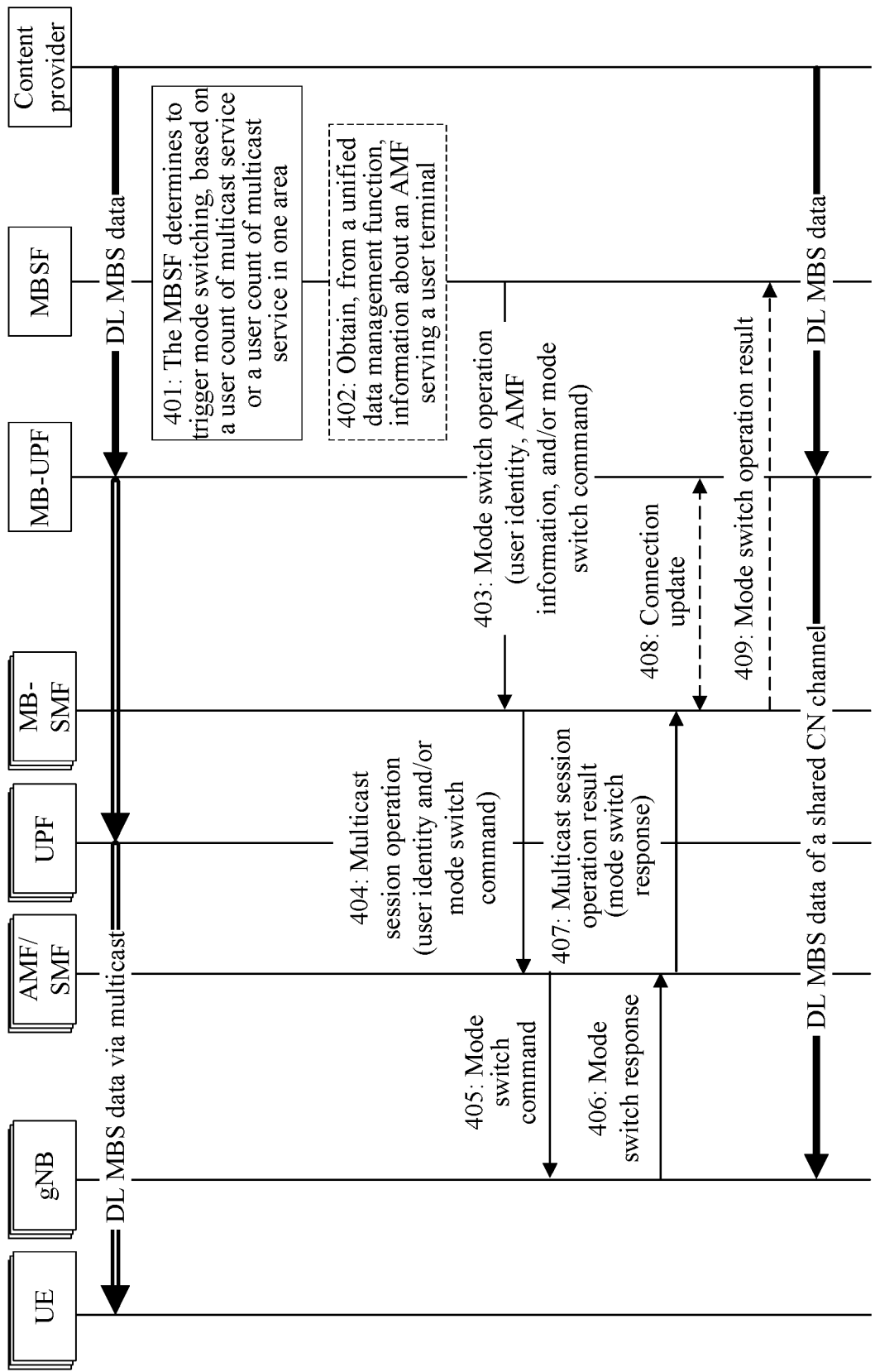
FIG. 4 is a flowchart 1 of performing, by a core network, multicast mode switching according to an embodiment of the present invention.

Referring to FIG. 4, FIG. 4 schematically shows a procedure in which a core network performs multicast mode switching. The procedure includes steps 401 to 409.

Step 401: The MBSF determines to trigger mode switching, based on a user count of multicast service, or a user count of multicast service in one area, or a service operation being invoked. For example, a content provider invokes a service operation towards the MBSF, or the MB-SMF invokes the service operation towards the MBSF.

For example, after receiving a multicast data packet, the MB-UPF replaces destination addresses of the data packet with addresses of user terminals in the multicast service one by one for forwarding (that is, in unicast mode). The forwarded data packet is routed to a UPF that has established a session connection to a corresponding user terminal, and the UPF then forwards the data packet to the user terminal. The MBSF determines to switch from a unicast mode to a multicast mode, based on the user count of multicast service or a user count of multicast service in one or more areas (for example, a tracking area or a base station node).

It can be understood that the following steps are performed for each user terminal one by one.

Step 402: The MBSF obtains, from a UDM, information about an AMF serving a user terminal.

For example, the MBSF requests, from the UDM, information about an AMF serving a user terminal, for example, an AMF identifier (such as a globally unique AMF identifier (Globally Unique AMF ID, GUAMI)).

Step 403: The MBSF invokes a mode switch operation towards the MB-SMF.

For example, an Nmbsmf_ModeSwitch operation including a mode switch command sent to a base station is invoked. The mode switch command carries session information, such as a TMGI or an IP multicast address, used to notify the base station to establish a shared data channel with the MB-UPF.

The mode switch operation may further include one or more of the following:

(1) address information of the MB-UPF;

(2) a user identity, such as a subscription permanent identifier (SUPI) or an international mobile subscriber identity (IMSI); and (3) information about an AMF, such as a GUAMI.

Step 404: The MB-SMF invokes a multicast session operation towards the AMF.

The MB-SMF requests, from a unified data management (UDM) for information about an AMF serving a user terminal, for example, the GUAMI. The MB-SMF invokes an Namf_MBSession operation towards the AMF, including the user identity and/or the mode switch command.

Step 405: The AMF forwards the mode switch command to a base station (gNB) serving the user terminal.

Step 406: The base station reserves a multicast resource, and sends a mode switch response to the AMF.

The mode switch response may carry one or more of the following: (1) information about the base station; and (2) channel identification information.

If the base station has established a shared data channel with the MB-UPF, the base station directly sends information about the existing shared channel to the AMF, or sends an indication that no channel needs to be established, or sends no message.

Step 407: After receiving the mode switch response sent by the base station, the AMF returns a multicast session operation result to the MB-SMF.

The multicast session operation result may carry the received mode switch response.

Step 408: The MB-SMF and the MB-UPF perform a connection update.

For example, the MB-SMF determines, based on the mode switch response, to update the MB-UPF (that is, establish shared channels between the MB-UPF and corresponding base stations), and command the MB-UPF to update a multicast session, including informing the MB-UPF of address information of the corresponding base stations and channel identifiers.

Step 409: The MB-SMF may return a mode switch operation result to the MBSF.

Now, the MB-UPF can forward received multicast data packets to the shared channels between the MB-UPF and the base stations.

Embodiment 2

Figure 5:
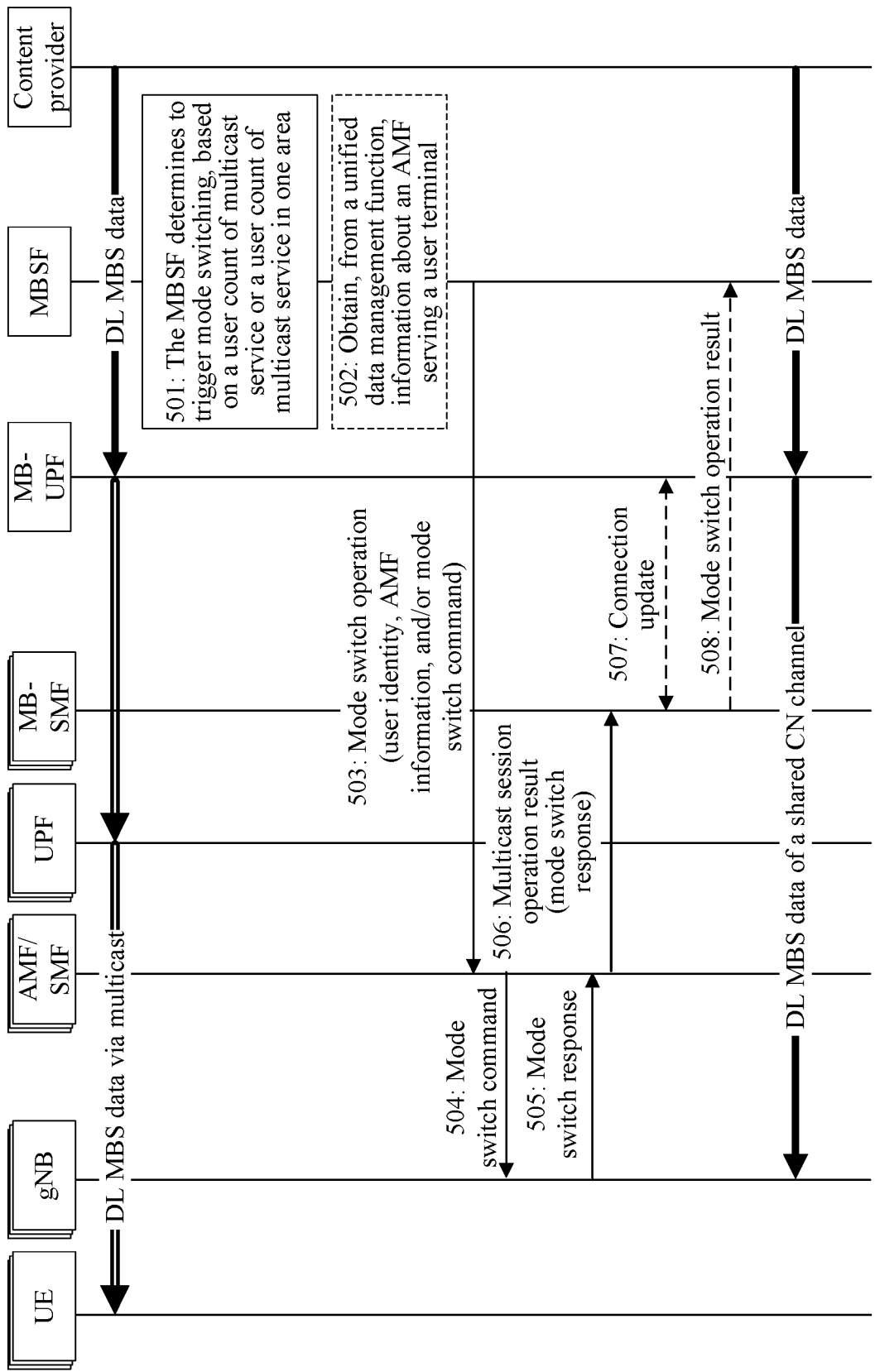
FIG. 5 is a flowchart 2 of performing, by a core network, multicast mode switching according to an embodiment of the present invention.

Referring to FIG. 5, FIG. 5 schematically shows a procedure in which a core network performs multicast mode switching. The procedure includes steps 501 to 508.

Steps 501 and 502: Same as the descriptions of steps 401 and 402 in Embodiment 1.

It can be understood that the following steps are performed for each user terminal one by one.

Step 503: The MBSF invokes a mode switch operation towards the AMF, for example, an Namf_Communicatioon_N1N2MessageTransfer operation including a mode switch command sent to a base station system. The mode switch command carries session information, such as a TMGI, used to notify the base station system to establish a shared data channel with the MB-UPF. The mode switch operation may carry address information of the MB-UPF, and may further carry a user identity, such as an SUPI or an IMSI.

Steps 504 to 508: Same as the descriptions of steps 405 to 409 in Embodiment 1.

Embodiment 3

Figure 6:
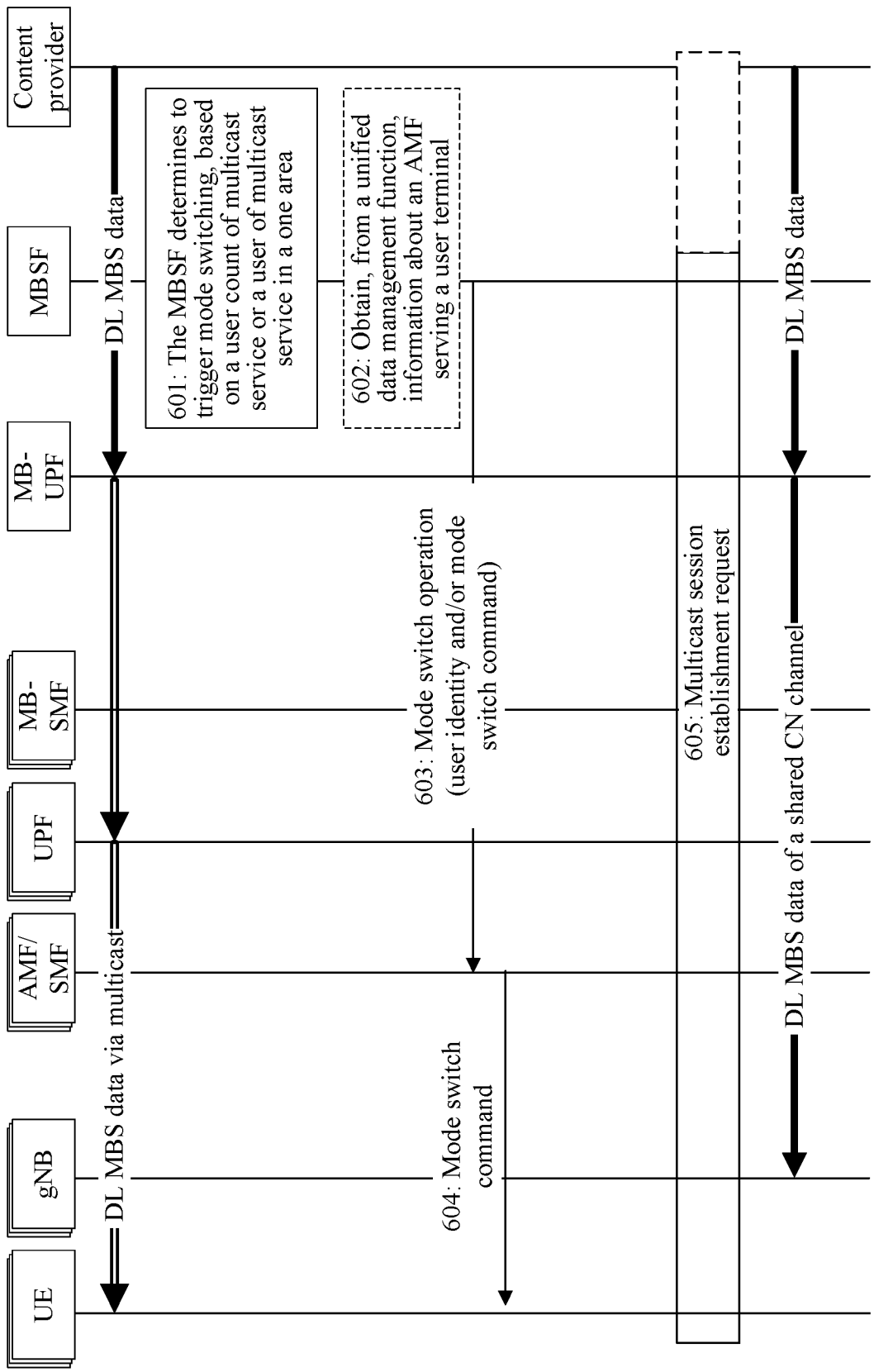
FIG. 6 is a flowchart 3 of performing, by a core network, multicast mode switching according to an embodiment of the present invention.

Referring to FIG. 6, FIG. 6 schematically shows a procedure in which a core network performs multicast mode switching. The procedure includes steps 601 to 608.

Steps 601 and 602: Same as the descriptions of steps 401 and 402 in Embodiment 1.

It can be understood that the following steps are performed one by one for each user.

Step 603: The MBSF invokes a mode switch operation towards the AMF, for example, an Namf_Communicatioon_N1N2MessageTransfer operation including a mode switch command sent to the user terminal. The mode switch command carries service information, such as a TMGI, used to notify the user terminal to initiate a multicast session establishment process. The mode switch operation may further carry a user identity, such as an SUPI or an IMSI.

Step 604: The AMF forwards the mode switch command to the user terminal.

Step 605: The user terminal initiates a multicast session establishment request, for example, sends a PDU session establishment message carrying a TMGI or an IP multicast address, to trigger the multicast session establishment process. In this process, the MBSF notifies the MB-SMF to establish a shared data channel between a base station node and the MB-UPF.

Embodiment 4

Figure 7:
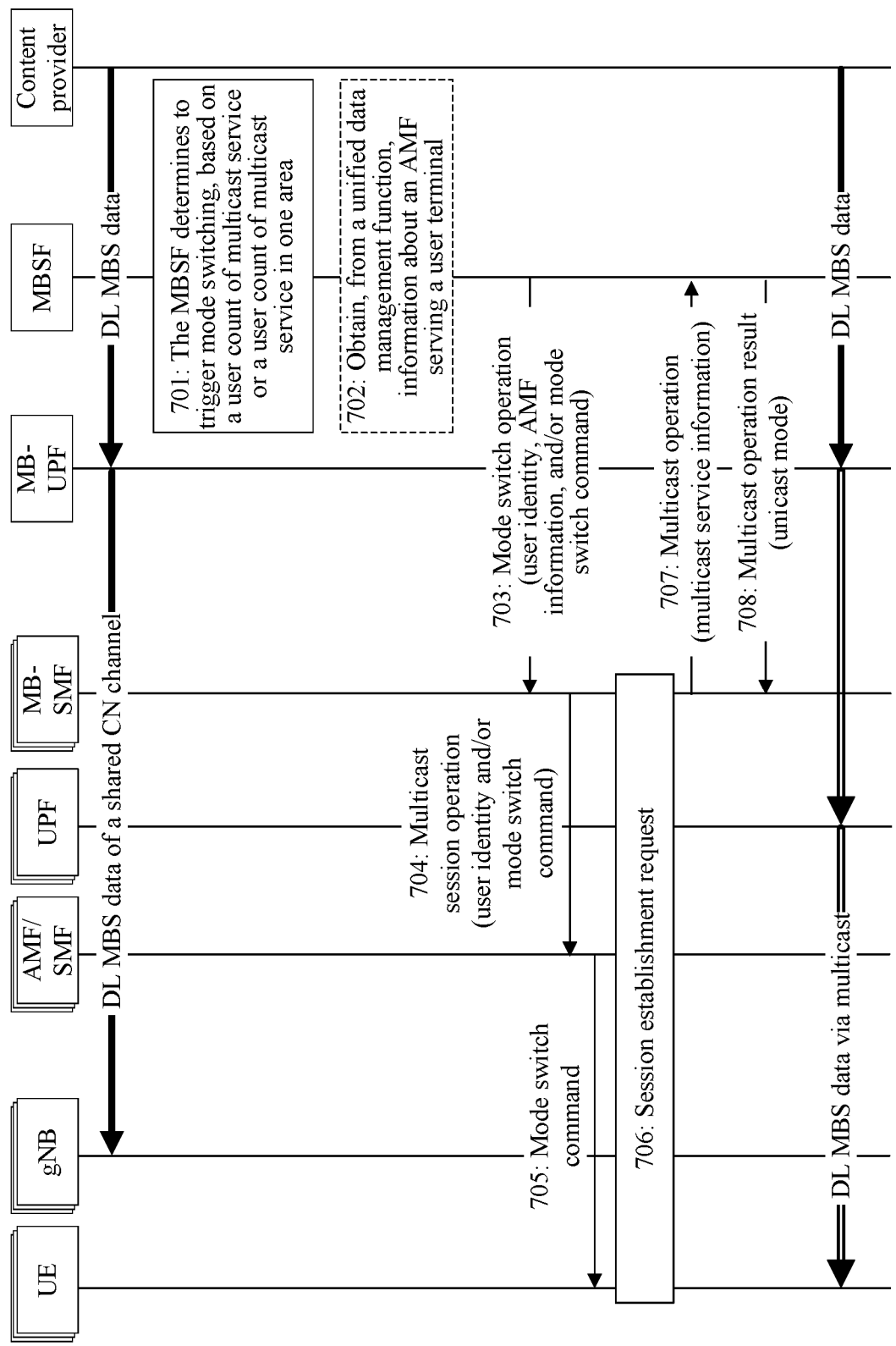
FIG. 7 is a flowchart 4 of performing, by a core network, multicast mode switching according to an embodiment of the present invention.

Referring to FIG. 7, FIG. 7 schematically shows a procedure in which a core network performs multicast mode switching. The procedure includes steps 701 to 708.

Step 701: The MBSF determines to trigger mode switching, based on a user count of multicast service, or a user count of multicast service in one area, or a service operation being invoked. For example, a content provider invokes a service operation towards the MBSF, or the MB-SMF invokes a service operation towards the MBSF.

For example, after receiving multicast data packets, the MB-UPF forwards the data packets to base stations one by one over shared channels between the MB-UPF and the base stations (that is, in a multicast mode), and the base stations then forward the data packets to user terminals. The MBSF determines to switch the multicast mode to a unicast mode, based on a user count of multicast service or a user count of multicast service in one or more areas (for example one or more tracking areas or one or more base station nodes).

It can be understood that the following steps are performed for each user terminal one by one.

Step 702: The MBSF obtains, from a UDM, information about an AMF serving a user terminal.

For example, the MBSF requests, from the UDM, information about an AMF serving a user terminal, for example, an AMF identifier (e.g. Globally Unique AMF Identifier GUAMI).

Step 703: The MBSF invokes a mode switch operation towards the MB-SMF serving the user terminal.

For example, an Nmbsmf_ModeSwitch operation including a mode switch command sent to the user terminal is invoked. The mode switch command may carry service information, such as a TMGI or an IP multicast address, used to notify the user terminal to establish a unicast data connection to the core network.

Further, the service information may carry one or more of the following: (1) a user identity, for example, an SUPI or an IMSI; and (2) information about the AMF, for example, an AMF identifier (e.g. Globally Unique AMF Identifier GUAMI).

Step 704: The MB-SMF invokes a multicast session operation towards the AMF.

For example, the MB-SMF requests, from the UDM, information about an AMF serving a user terminal, for example, an AMF identifier (e.g. Globally Unique AMF Identifier GUAMI). The MB-SMF invokes a multicast session operation towards the AMF, for example, invokes an Namf_MBSession operation.

The multicast session operation carries the user identity and/or the mode switch command.

Step 705: The AMF forwards the mode switch command to the user terminal.

Step 706: The user terminal initiates a session establishment request to the core network.

For example, the user terminal sends a request message, and the request message includes one or more of the following:

(1) a PDU session establishment message;
(2) a PDU session modification message;
(3) a service request message; and (4) a multicast session establishment request message (for example, a multicast service request (MB Service Request) message).

The request message may carry the service information, for example, the TMGI or the IP multicast address.

Step 707: The MB-SMF invokes a multicast operation towards the MBSF.

For example, in a process of multicast session establishment, the MB-SMF invokes a multicast operation towards the MBSF, for example, an Nmbsf_UserAuth operation including service information, for example, the TMGI or the IP multicast address.

Step 708: The MBSF determines that a mode switch operation has been performed for the multicast service, and returns a multicast operation result to the MB-SMF.

The multicast operation result may carry a unicast mode indication, or not carry a mode indication used to indicate the use of the unicast mode.

Embodiment 5

Figure 8:
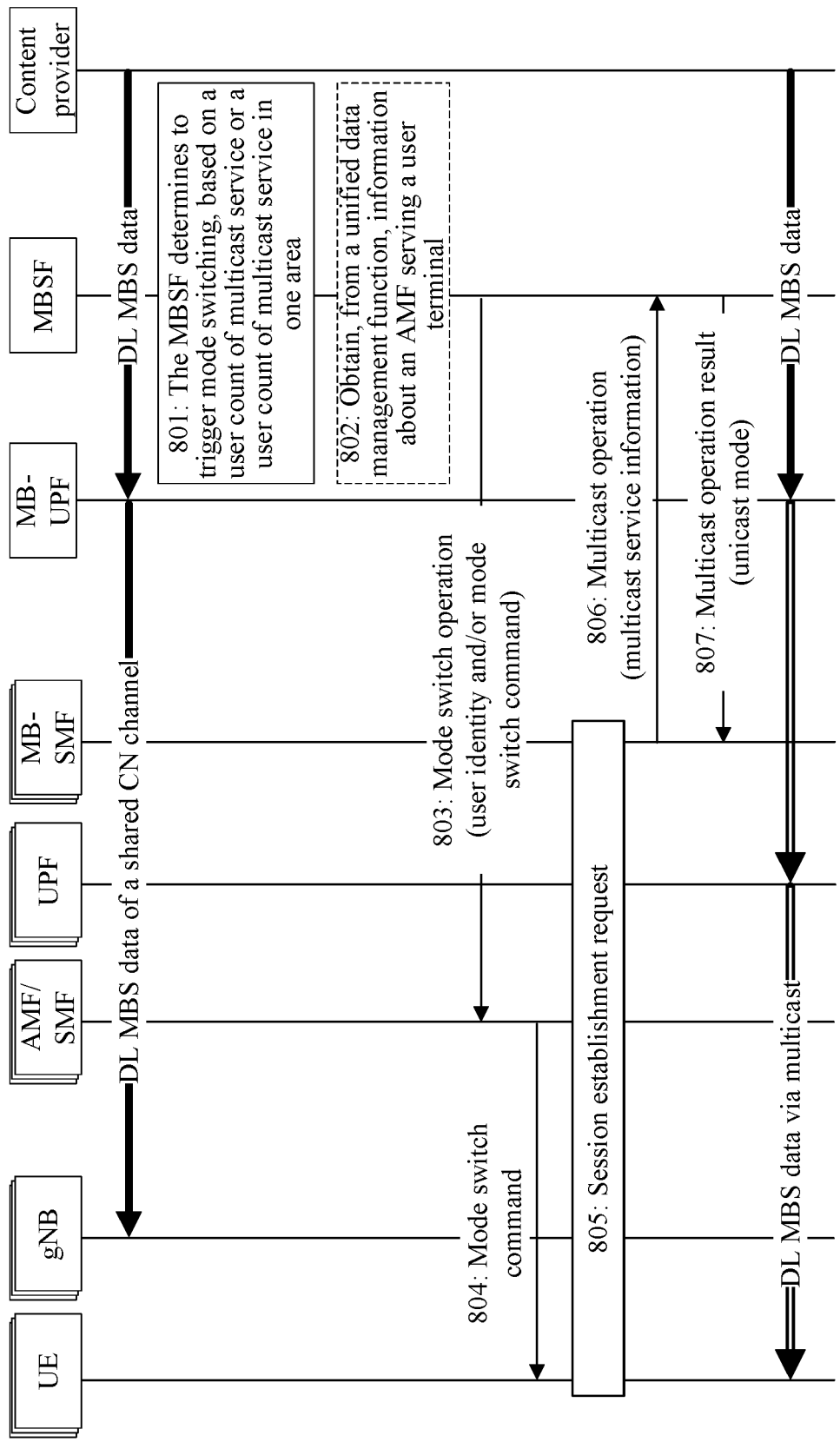
FIG. 8 is a flowchart 5 of performing, by a core network, multicast mode switching according to an embodiment of the present invention.

Referring to FIG. 8, FIG. 8 schematically shows a procedure in which a core network performs multicast mode switching. The procedure includes steps 801 to 808.

Steps 801 and 802: Same as the descriptions of steps 701 and 702 in Embodiment 4.

It can be understood that the following steps are performed one by one for each user.

Step 803: The MBSF invokes a mode switch operation towards the AMF, for example, an Namf_Communicatioon_N1N2MessageTransfer operation including a mode switch command sent to the user terminal. The mode switch command carries service information, such as a TMGI, used to notify the user terminal to use a unicast data connection. The mode switch operation may further carry a user identity, such as an SUPI or an IMSI.

Steps 804 to 807: Same as the descriptions of steps 705 to 708 in Embodiment 4.

Embodiment 6

Figure 9:
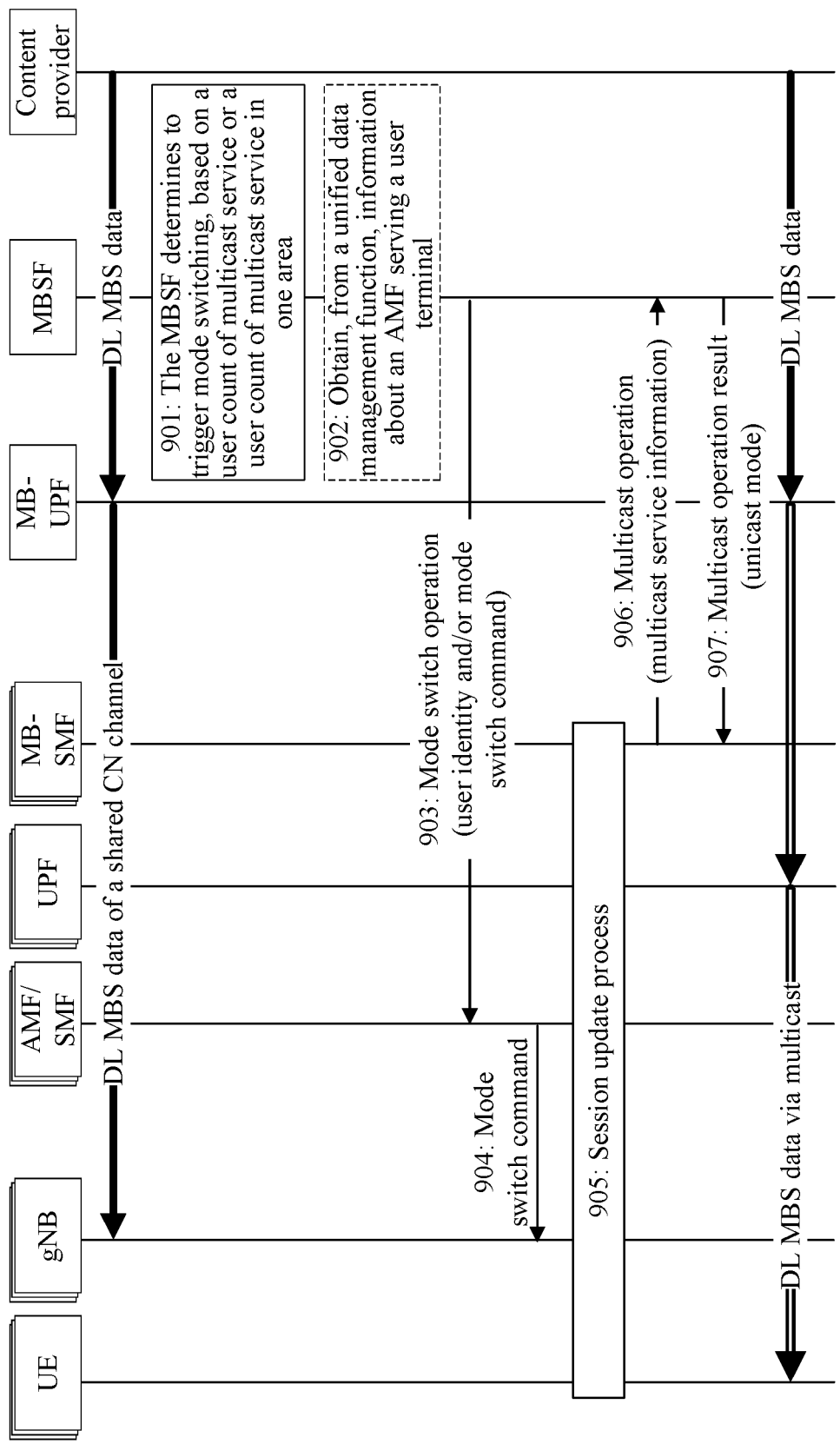
FIG. 9 is a flowchart 6 of performing, by a core network, multicast mode switching according to an embodiment of the present invention.

Referring to FIG. 9, FIG. 9 schematically shows a procedure in which a core network performs multicast mode switching. The procedure includes steps 901 to 907.

Steps 901 and 902: Same as the descriptions of steps 701 and 702 in Embodiment 4.

It can be understood that the following steps are performed one by one for each user.

Step 903: The MBSF invokes a mode switch operation towards the AMF, for example, an Namf_Communicatioon_N1N2MessageTransfer operation including a mode switch command sent to a base station system. The mode switch command carries session information, such as a PDU session ID, or a TMGI, or an IP multicast address, used to notify the base station system to initiate a session update process, so as to establish a unicast data connection between the user terminal and the core network. The mode switch operation may further carry a user identity, such as an SUPI or an IMSI.

Step 904: The AMF forwards the mode switch command to a base station node serving a user terminal.

Step 905: The base station node initiates the session update process, for example, sends a message carrying the PDU session ID and the TMGI to the AMF.

Step 906: The MB-SMF invokes, in a process of multicast session update, a multicast operation towards the MBSF, for example, an Nmbsf_UserAuth operation including the service information, for example, the TMGI or the IP multicast address.

Step 907: The MBSF determines that a mode switch operation has been performed for the multicast service, and returns a multicast operation result to the MB-SMF. The multicast operation result carries a unicast mode indication, or carries no mode indication which indicates the use of unicast mode.

Embodiment 7

Figure 10:
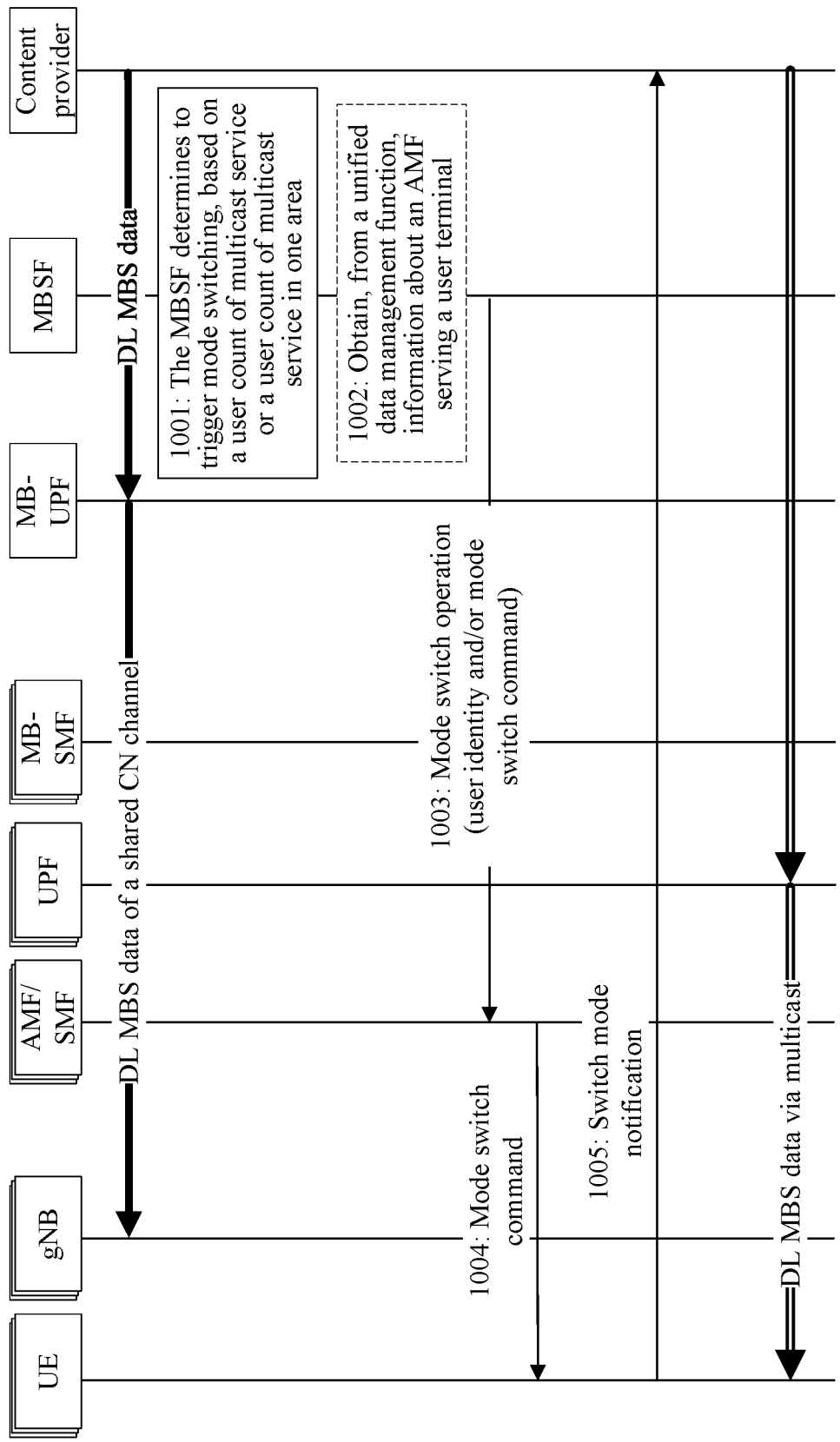
FIG. 10 is a flowchart 7 of performing, by a core network, multicast mode switching according to an embodiment of the present invention.

Referring to FIG. 10, FIG. 10 schematically shows a procedure in which a core network performs multicast mode switching. The procedure includes steps 1001 to 1005.

Steps 1001 and 1002: Same as the descriptions of steps 701 and 702 in Embodiment 4.

The following steps are performed one by one for each user.

Step 1003: The MBSF invokes a mode switch operation towards the AMF, for example, an Namf_Communicatioon_N1N2MessageTransfer operation including a mode switch command sent to the user terminal. The mode switch command carries service information, such as a TMGI or an IP multicast address, used to notify the user terminal to use a unicast data connection. The mode switch operation may further carry a user identity, such as an SUPI or an IMSI.

Step 1004: The user terminal receives the mode switch command from AMF or SMF.

Step 1005: The user terminal sends a mode switching notification to a content provider, to notify the content provider to send service data to the user terminal as a target.

Figure 11:
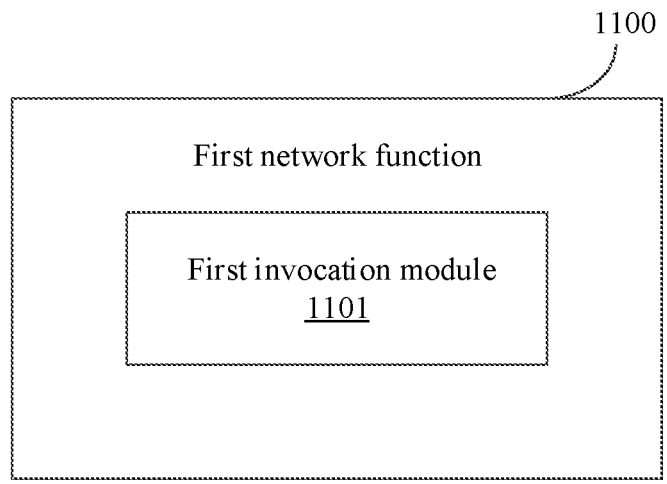
FIG. 11 is a schematic diagram of a first network function according to an embodiment of the present invention.

Referring to FIG. 11, an embodiment of the present invention further provides a first network function. The first network function 1100 includes:

a first invocation module 1101, configured to invoke a mode switch operation towards a second network function, where a parameter of the mode switch operation includes first information, the first information includes a mode switch command, and the mode switch command is used to notify a target party to perform a mode switch operation In some implementations, the first network function 1100 further includes:

a determining module, configured to perform, based on a user count of multicast service, or a user count in a multicast service area, or a service operation being invoked, the invoking a mode switch operation towards a second network function.

In some implementations, the first information further includes one or more of the following: user information, and information about an AMF serving the user terminal.

In some implementations, the first network function 1100 further includes: a first querying module, configured to query a unified data management function for the information about the AMF.

In some implementations, the target party is the user terminal or a radio access network node.

In some implementations, the mode switch command includes service information or session information.

The service information is used for at least one of the following:

(1) for the user terminal to send a first message to a network side, where the first message is used for the user terminal to establish a unicast channel or a multicast channel for service data transmission with the network side; and (2) for the user terminal to send a second message to an application server, where the second message is used to notify the application server to send service data to the user terminal.

The session information is used for at least one of the following:

(1) for the radio access network node to send a third message to a core network, where the third message is used for the radio access network node to establish or maintain a multicast channel for service data transmission with a third network function, or for the radio access network node to establish a unicast channel for service data transmission with a fourth network function; and (2) for the radio access network node to send no message to maintain a multicast channel for service data transmission with the third network function.

In some implementations, the mode switch command includes one or more of the following:

(1) information about the third network function;
(2) a temporary mobile group identity;
(3) a multicast address, for example, an IP multicast address; and
(4) a protocol data unit session identifier.

The first network function provided in this embodiment of the present invention may perform the foregoing method embodiment shown in FIG. 1. An implementation principle and a technical effect of the first network function are similar thereto, and details are not described again herein in this embodiment.

Figure 12:
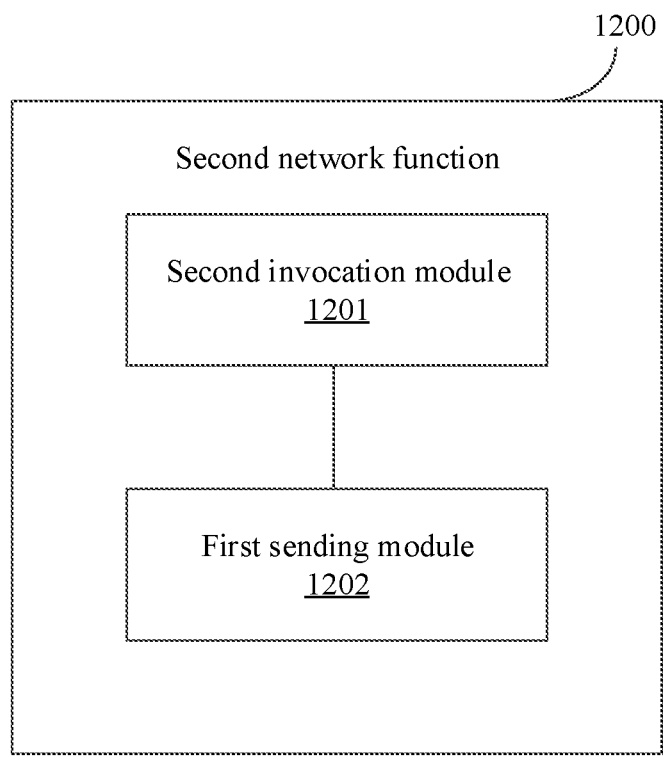
FIG. 12 is a schematic diagram of a second network function according to an embodiment of the present invention.

Referring to FIG. 12, an embodiment of the present invention further provides a second network function. The second network function 1200 includes:

a second invocation module 1201, configured to determine whether a mode switch operation is invoked by a first network function, where a parameter of the mode switch operation includes first information, and the first information includes a mode switch command; and a first sending module 1202, configured to: when the mode switch operation is invoked by the first network function, invoke a service operation towards a fifth network function, where a parameter of the service operation includes content of the mode switch command; or send the mode switch command to a user terminal; or send the mode switch command to a radio access network node.

In some implementations, the first information further includes one or more of the following: user information, and information about an access and mobility management function serving the user terminal.

In some implementations, the second network function 1200 further includes:

a second querying module, configured to query a unified data management function for the information about the access and mobility management function serving the user terminal.

The second network function provided in this embodiment of the present invention may perform the foregoing method embodiment shown in FIG. 2. An implementation principle and a technical effect of the second network function are similar thereto, and details are not described again herein in this embodiment.

Figure 13:
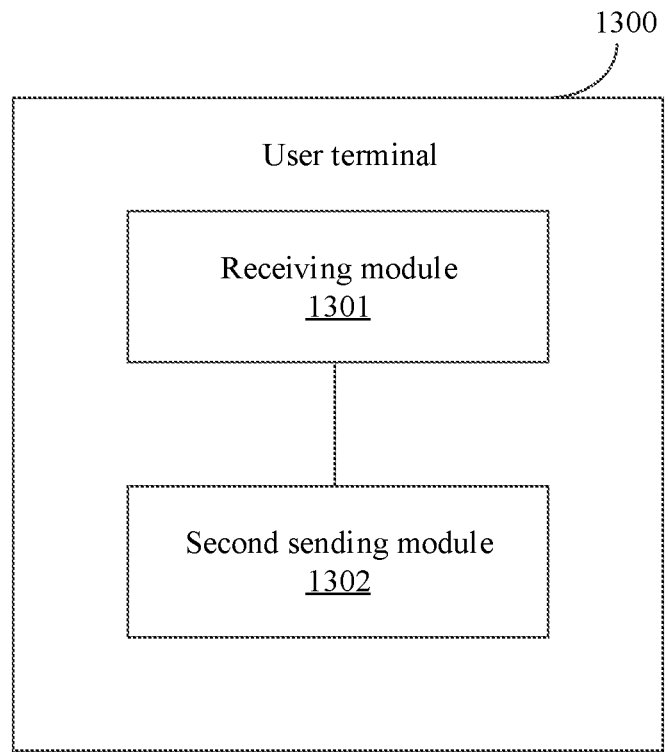
FIG. 13 is a schematic diagram of a user terminal according to an embodiment of the present invention.

Referring to FIG. 13, an embodiment of the present invention further provides a user terminal. The user terminal 1300 includes:

a receiving module 1301, configured to receive a mode switch command from a network side; and a second sending module 1302, configured to send a first message to the network side, where the first message is used for the user terminal to establish a unicast channel or a multicast channel for service data transmission with the network side, or to send a second message to an application server, and the second message is used to notify the application server to send service data to the user terminal.

Optionally, the mode switch command is obtained by the second network function from a parameter of a mode switch operation invoked by a first network function.

In some implementations, the mode switch command includes service information.

The service information is used for at least one of the following: for the user terminal to send the first message to the network side, where the first message is used for the user terminal to establish the unicast channel or the multicast channel for service data transmission with the network side; and for the user terminal to send the second message to the application server, where the second message is used to notify the application server to send service data to the user terminal.

In some implementations, the mode switch command includes one or more of the following: a TMGI and a multicast address.

The user terminal provided in this embodiment of the present invention may perform the foregoing method embodiment shown in FIG. 3. An implementation principle and a technical effect of the user terminal are similar thereto, and details are not described again herein in this embodiment.

Figure 14:
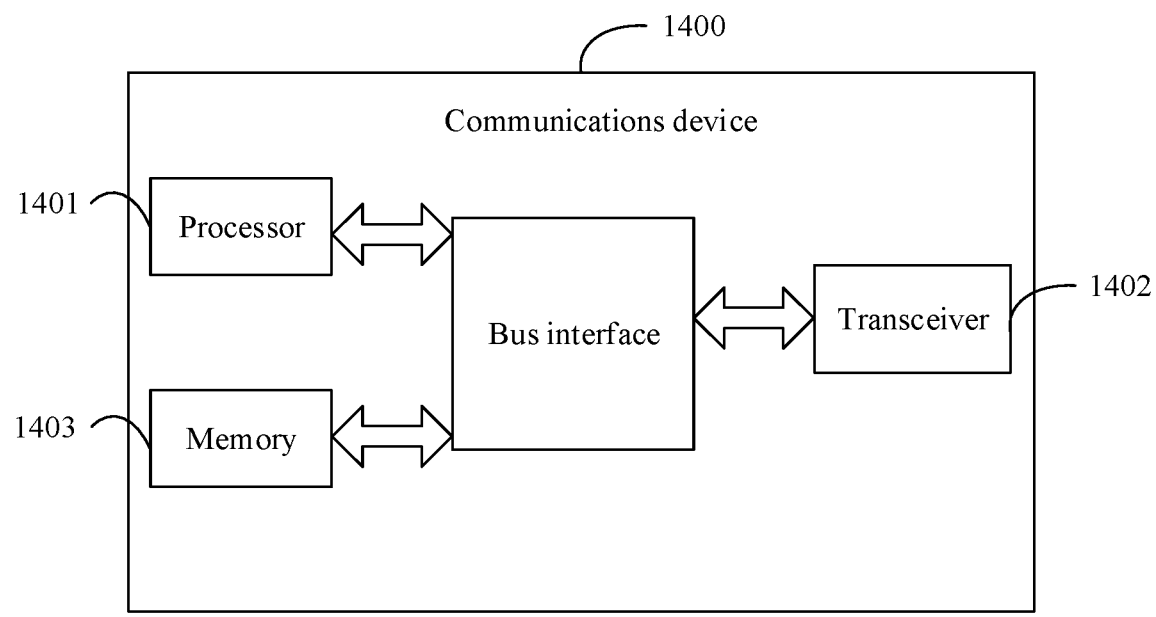
FIG. 14 is a schematic diagram of a communications device according to an embodiment of the present invention.

Referring to FIG. 14, FIG. 14 is a structural diagram of a communications device applied in an embodiment of the present invention. As shown in FIG. 14, the communications device 1400 includes: a processor 1401, a transceiver 1402, a memory 1403, and a bus interface.

In an embodiment of the present invention, the communications device 1400 further includes: a computer program stored on the memory 1403 and capable of running on the processor 1401. When the computer program is executed by the processor 1401, the steps in the embodiment shown in FIG. 1, FIG. 2, or FIG. 3 are implemented.

In FIG. 14, a bus architecture may include any number of interconnected buses and bridges, and link together one or more processors specifically represented by the processor 1401 and various circuits of a memory represented by the memory 1403. The bus architecture may further link together various other circuits, such as a peripheral device, a voltage regulator, and a power management circuit, which are well known in the art and therefore are not further described herein. A bus interface provides an interface. The transceiver 1402 may be a plurality of elements, including a transmitter and a receiver, providing a unit for communicating with various other apparatuses over a transmission medium.

The processor 1401 is responsible for managing the bus architecture and general processing, and the memory 1403 may store data used by the processor 1401 when performing an operation.

The communications device provided in this embodiment of the present invention may perform the foregoing method embodiment shown in FIG. 1, FIG. 2, or FIG. 3. An implementation principle and a technical effect of the communications device are similar thereto, and details are not described again herein in this embodiment.

The method or algorithm steps described in combination with content disclosed in the present invention may be implemented by hardware, or may be implemented by a processor by executing software instructions. The software instructions may be formed by a corresponding software module. The software module may be stored in a random access memory (RAM), a flash memory, a read-only memory (ROM), an erasable programmable read-only memory (Erasable PROM, EPROM), an electrically erasable programmable read-only memory (Electrically EPROM, EEPROM), a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

Persons skilled in the art should be aware that in the foregoing one or more examples, functions described in the present invention may be implemented by hardware, software, firmware, or any combination thereof. When implemented by software, the functions may be stored in a computer-readable medium or transmitted over as one or more instructions or code in a computer-readable medium. The computer-readable medium includes a computer storage medium and a communications medium, where the communications medium includes any medium that facilitates transfer of a computer program from one place to another. The storage medium may be any available medium that is accessible by a general-purpose or special-purpose computer.

The objectives, technical solutions, and beneficial effects of the present invention are further described in detail by the specific implementations described above. It should be understood that those described above are merely specific implementations of the present invention, and are not used to limit the scope of protection of the present invention. Any modifications, equivalent replacements, improvements etc. that are based on the technical solutions of the present invention shall fall within the scope of protection of the present invention.

Persons skilled in the art should understand that the embodiments of the present invention may be provided as a method, a system, or a computer program product. Therefore, the embodiments of the present invention may take the form of hardware-only embodiments, software-only embodiments, or embodiments with a combination of software and hardware. Moreover, the embodiments of the present invention may take the form of a computer program product that is implemented on one or more computer-usable storage media (including but not limited to a disk memory, a CD-ROM, an optical memory, etc.) that contain computer-usable program code.

The embodiments of the present invention are described with reference to flowcharts and/or block diagrams of the methods, devices (systems), and computer program products according to the embodiments of the present invention. It should be understood that each process and/or block in the flowcharts and/or block diagrams, and combinations of the processes and/or blocks in the flowcharts and/or block diagrams may be implemented by computer program instructions. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or one or more blocks in the block diagrams.

Apparently, persons skilled in the art can make various changes and variations to the embodiments of the present invention without departing from the spirit and scope of the present invention. In this way, if these changes and variations to the embodiments of the invention fall within the scope of the claims of the present invention and equivalent technologies thereof, the present invention is also intended to include these changes and variations.

What is claimed is:

1. A method for mode switching, performed by a first network function, wherein the method comprises:
    invoking a channel mode switch operation towards a second network function, wherein a parameter of the channel mode switch operation comprises first information, and the first information comprises a channel mode switch command; and
    the channel mode switch command is used to notify a target party to perform a channel mode switch operation, wherein, the channel mode switch operation comprises switch from a multicast channel to a unicast channel or switch from a unicast channel to a multicast channel,
    the multicast channel comprises a multicast service data transmission channel between a core network user plane function and a radio access network node, the multicast channel is shared by all user terminals of a multicast service served by the radio access network node;
    the unicast channel is a channel established by a core network user plane function for multicast service data transmission with each user terminal to separately send multicast service data to each user terminal.

2. The method according to claim 1, wherein before the invoking a channel mode switch operation towards a second network function, the method further comprises:
    determining, based on a user count of multicast service, or a user count in a multicast service area, or a service operation being invoked, whether to perform the invoking a channel mode switch operation towards a second network function.

3. The method according to claim 1, wherein the first information further comprises one or more of the following: user information, and information about an access and mobility management function serving a user terminal.

4. The method according to claim 1, further comprising:
   querying a unified data management function for information about an access and mobility management function.

5. The method according to claim 1, wherein the target party is a user terminal or a radio access network node.

6. The method according to claim 5, wherein the channel mode switch command comprises: service information or session information;
   the service information is used to indicate at least one of the following:
   send a first message, wherein the first message is used to establish a unicast channel or a multicast channel for service data transmission between the user terminal and a network-side device, and the network-side device comprises the first network function; and
   send a second message to an application server, wherein the second message is used to notify the application server to send service data to the user terminal;
   wherein, the session information is used to indicate at least one of the following:
   send a third message to a core network, wherein the third message is used to establish or maintain a multicast channel for service data transmission between the radio access network node and a third network function, or to establish a unicast channel for service data transmission between the radio access network node and a fourth network function; and
   send no message to maintain a multicast channel for service data transmission between the radio access network node and the third network function.

7. The method according to claim 5, wherein the channel mode switch command comprises one or more of the following:
   information about a third network function;
   a temporary mobile group identity TMGI;
   a multicast address; and
   a protocol data unit session identifier.

8. A method for mode switching, performed by a second network function, wherein the method comprises:
   determining whether a channel mode switch operation is invoked by a first network function, wherein a parameter of the channel mode switch operation comprises first information, and the first information comprises a channel mode switch command; and
   when the channel mode switch operation is invoked by the first network function, invoking a service operation towards a fifth network function, wherein a parameter of the service operation comprises content of the channel mode switch command; or sending the channel mode switch command to a user terminal; or sending the channel mode switch command to a radio access network node,
   wherein, the channel mode switch operation comprises switch from a multicast channel to a unicast channel or switch from a unicast channel to a multicast channel,
   the multicast channel comprises a multicast service data transmission channel between a core network user plane function and a radio access network node, the multicast channel is shared by all user terminals of a multicast service served by the radio access network node;
   the unicast channel is a channel established by a core network user plane function for multicast service data transmission with each user terminal to separately send multicast service data to each user terminal.

9. The method according to claim 8, wherein the first information further comprises one or more of the following: user information, and information about an access and mobility management function serving the user terminal.

10. The method according to claim 8, further comprising:
    querying a unified data management function for information about an access and mobility management function serving the user terminal.

11. A method for mode switching, performed by a user terminal, wherein the method comprises:
    receiving a channel mode switch command from a network side; and
    sending a first message to the network side, wherein the first message is used to establish a unicast channel or a multicast channel for service data transmission between the user terminal and the network side, or to send a second message to an application server, and the second message is used to notify the application server to send service data to the user terminal,
    wherein, the channel mode switch operation comprises switch from a multicast channel to a unicast channel or switch from a unicast channel to a multicast channel,
    the multicast channel comprises a multicast service data transmission channel between a core network user plane function and a radio access network node, the multicast channel is shared by all user terminals of a multicast service served by the radio access network node;
    the unicast channel is a channel established by a core network user plane function for multicast service data transmission with each user terminal to separately send multicast service data to each user terminal.

12. The method according to claim 11, wherein the channel mode switch command comprises: service information; and
    the service information is used to indicate at least one of the following:
    for the user terminal to send the first message to the network side, wherein the first message is used to establish a unicast channel or a multicast channel for service data transmission between the user terminal and the network side; and
    for the user terminal to send the second message to the application server, wherein the second message is used to notify the application server to send service data to the user terminal.

13. The method according to claim 11, wherein the channel mode switch command comprises one or more of the following:
    a TMGI; and
    a multicast address.

14. A communications device, comprising: a processor, a memory, and a program stored on the memory and capable of running on the processor, wherein when the program is executed by the processor, the processor is configured to perform the steps of the method for mode switching according to claim 1.

15. The communications device according to claim 14, wherein the target party is a user terminal or a radio access network node.

16. A communications device, comprising: a processor, a memory, and a program stored on the memory and capable of running on the processor, wherein when the program is executed by the processor, the processor is configured to perform the steps of the method for mode switching according to claim 8.

17. A communications device, comprising: a processor, a memory, and a program stored on the memory and capable of running on the processor, wherein when the program is executed by the processor, the processor is configured to perform the steps of the method for mode switching according to claim 11.

18. A non-transitory computer-readable storage medium, wherein the computer-readable storage medium stores a computer program, and when the computer program, when executed by a processor, causes the processor to implement the steps of the method for mode switching according to claim 1.

19. A non-transitory computer-readable storage medium, wherein the computer-readable storage medium stores a computer program, and when the computer program, when executed by a processor, causes the processor to implement the steps of the method for mode switching according to claim 8.

20. A non-transitory computer-readable storage medium, wherein the computer-readable storage medium stores a computer program, and when the computer program, when executed by a processor, causes the processor to implement the steps of the method for mode switching according to claim 11.

* * * * *